United States Patent [19]

Shibuya et al.

[11] 4,276,020
[45] Jun. 30, 1981

[54] METHOD FOR HEATING POWDER MATERIAL AND APPARATUS FOR CARRYING OUT SAID METHOD

[75] Inventors: Kyoichi Shibuya; Tomomi Ihara, both of Narashino, Japan

[73] Assignee: Sumitomo Cement Co., Ltd., Kanda, Japan

[21] Appl. No.: 57,570

[22] Filed: Jul. 16, 1979

[30] Foreign Application Priority Data

Aug. 4, 1978 [JP] Japan ................... 53-95262

[51] Int. Cl.³ .............................................. F27B 15/00
[52] U.S. Cl. ........................................... 432/14; 106/100; 432/58; 432/106
[58] Field of Search .......................... 432/14, 58, 106; 106/100

[56] References Cited

U.S. PATENT DOCUMENTS

| | | | |
|---|---|---|---|
| 3,881,861 | 5/1975 | Ritzmann | 432/14 |
| 4,125,363 | 11/1978 | Hansen | 432/14 |
| 4,130,390 | 12/1978 | Kobayashi et al. | 432/14 |

*Primary Examiner*—John J. Camby
*Attorney, Agent, or Firm*—Kane, Dalsimer, Kane, Sullivan and Kurucz

[57] ABSTRACT

A method for heating powder material comprising the steps of allowing hot gas from a plurality of hot gas sources separate from each other to flow separately through a plurality of hot gas passages which include a plurality of dust collectors and ducts for connection between said dust collectors, separately charging raw material to be heated through the each duct leading to the dust collector located in the uppermost part of said respective hot gas passages, then uniting the charged powder material, then alternately wandering the united powder material from one hot gas passage to the other hot gas passage, thereby the united powder material is heated by heat exchanging with the respective hot gas streams, and finally discharging the heated powder material through the duct located below the lowermost dust collector. An apparatus is provided for carrying out the aforesaid method comprising a plurality of hot gas passages through which hot gas streams coming from a plurality of hot gas sources separate from each other flow, said hot gas passages consisting of dust collectors and ducts for connection between said dust collectors, raw material ducts for connection of the dust collector disposed in one of the hot gas passages to the duct disposed in the other one, and raw material feeders arranged for the respective hot gas passages.

8 Claims, 7 Drawing Figures 4,276,020

METHOD FOR HEATING POWDER MATERIAL AND APPARATUS FOR CARRYING OUT SAID METHOD

BACKGROUND OF THE INVENTION

The present invention relates to a method for heating powder material and an apparatus for carrying out said method. More particularly the invention relates to a method for preheating and/or calcining powder and an apparatus for carrying out said method.

It is well known that powder material such as a cement raw material is calcined and sintered in a furnace such as rotary kiln or the like after completion of preheating. There is a variety of apparatus for preheating, calcining and sintering, for instance, apparatus consisting of preheater and rotary kiln. Recently an apparatus with a preheater having a flash furnace (calcining furnace) annexed thereto has been proposed and has been used. This conventional apparatus is such that preheating and/or calcining of powder material is carried out with the use of hot gas coming from the rotary kiln or the like, but it is recognized as a disadvantage with the conventional apparatus that heat exchanging between hot gas and powder material takes place in less number of times, resulting in reduced thermal efficiency. For instance, in case of four stage type preheating apparatus, heat exchanging takes place only in four times at low thermal efficiency.

To eliminate the drawbacks with the hitherto known apparatus and method, there was proposed method wherein hot gas coming from single hot gas source is divided into two or more branch flows, heat exchanging takes place between the branch flows and raw material to be heated and then the waste hot gas in branch flows is again united and exhausted with the aid of single blower (c.f. Japanese Patent Publication No. 22855/64). This method brings about increased number of times of heat exchanging between raw material and hot gas, but it is found out therewith that thermal efficiency is not so good mainly because of single hot gas source. Moreover it is pointed out as another drawback with the aforesaid method that since there is provided a single inlet for supply of raw material to be heated, gas flow in the hot gas passage in which the raw material is charged is cooled down but other gas flow with no raw material charged therein remains hot, causing thermal efficiency not only to be reduced but also temperature and pressure at the blower to be controlled with much difficulty. Furthermore since the waste hot gas in two or more branch flows is united in a duct and exhausted with the aid of a single blower, it becomes necessary to control pressure and temperature difference in the respective branch flows by means of a pressure control dumper of the like mounted in said branch flow, which not only causes considerably high pressure loss but also increased size of the blower.

SUMMARY OF THE INVENTION

It is an object of the present invention to provide a method for heating powder material, in which heat exchanging takes place between powder material and hot gas in an increased number of times at an improved thermal efficiency and with remarkably reduced thermal and electrical energy consumption.

It is another object of the present invention to provide a method for heating powder material, in which there is no substantial difference in temperature and pressure of hot gas at each blower by means of which the hot gas is exhausted into the air.

It is further another object of the present invention to provide an apparatus for heating powder material, by means of which heat exchanging takes place between powder material and hot gas in an increased number of times at an improved thermal efficiency with remarkably reduced thermal and electrical energy consumption.

It is still further another object of the present invention to provide an apparatus for heating powder material, in which there is no substantial difference in temperature and pressure of hot gas at each blower by means of which the waste hot gas is exhausted into the air, resulting in minimized size of blower.

Other objects, features and advantages of the present invention will be apparent from the following detailed description of the preferred embodiments thereof taken in conjunction with the accompanying drawings.

To realize the above objects there is provided in accordance with the present invention a method for heating powder material, comprising the steps of allowing hot gas from a plurality of hot gas sources separate from each other to flow separately through a plurality of hot gas passages which include a plurality of dust collectors and ducts for connection between said dust collectors, separately charging raw material to be heated through the each duct which leads to the dust collector located in the uppermost part of said respective hot gas passages, then uniting the charged powder material, then alternately wandering the united powder material from one hot gas passage to the other hot gas passage, thereby the united powder material is heated by heat exchanging with the respective hot gas streams, and finally discharging the heated powder material through the duct located below the lowermost dust collector. An apparatus for heating powder material is also provided, comprising: a plurality of vertically disposed hot gas passages for flowing hot gas streams upwardly therethrough, said hot gas passages being separate from one another and having respectively a plurality of vertically spaced dust collectors; a plurality of hot gas sources connected to the lower ends of the respective hot gas passages, said hot gas sources being separate from one another; a plurality of blowers located in the uppermost parts of the respective hot gas passages for exhausting hot gas coming from the respective hot gas sources, said blowers being separate from one another; a plurality of raw material feeders, each connected to that portion of a respective one of the hot gas passages which extends between the respective uppermost dust collector and second dust collector disposed next thereto, said raw material feeders being separate from one another; raw material ducts for connecting the bottoms of the respective dust collectors of one of the hot gas passages to that portion of another hot gas passage which is located below said dust collector; and the lower most raw material duct for discharging powder material downwardly therefrom, said lower most raw material duct being connected to the bottom of the lowermost dust collector.

BRIEF DESCRIPTION OF THE ACCOMPANYING DRAWINGS

Figure 4C:
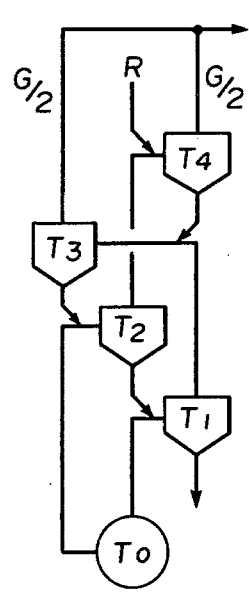
FIG. 4(A) is a schematic illustration of an apparatus for heating powder material in accordance with the invention.
Figure 4B:
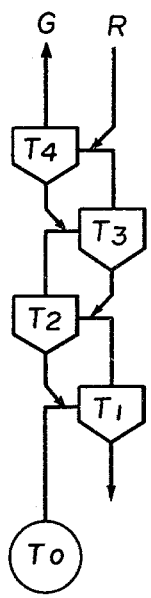
Figure 4A:
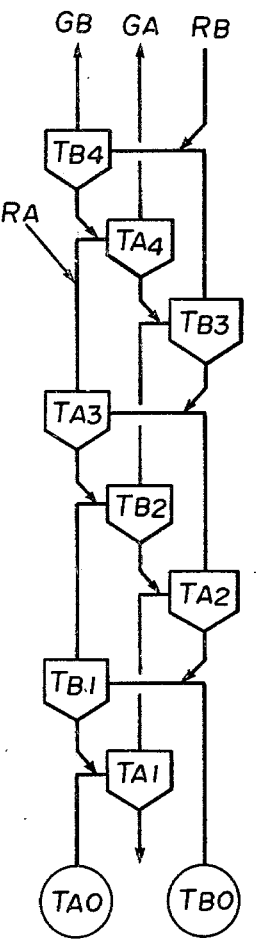
Figure 5:
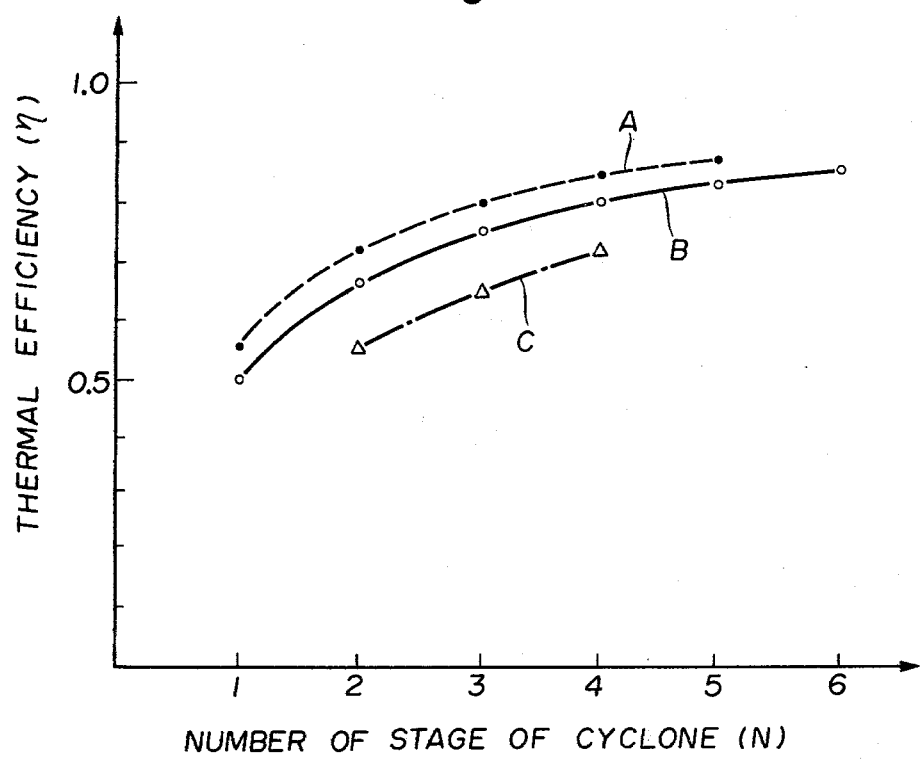

FIGS. 4(B) and (C) are schematic illustrations of a heating apparatus of the prior art respectively; and FIG. 5 is a diagram illustrating a thermal efficiency of the heating apparatus in accordance with the present invention as shown in FIG. 4(A) in comparison with that of the prior art as shown in FIG. 4(B) and (C).

DETAILED DESCRIPTION OF THE INVENTION

The apparatus of the invention is provided with a plurality of hot gas passages through which hot gas coming from a plurality of hot gas sources located separately from each other is adapted to flow. Namely the number of hot gas passages is equal to the number of hot gas sources. These hot gas passages comprise dust collectors and ducts for connection between said dust collectors. Below the dust collector of the respective hot gas passages is arranged a raw material duct which is connected to the duct in the other hot gas passage. Further in the predetermined position on the duct leading to the dust collector located in the uppermost part of the respective hot gas passages is arranged a raw material feeder annexed thereto. Moreover on the duct located in the uppermost end of the respective hot gas passages is arranged a blower annexed thereto, which serves to discharge the waste hot gas from the respective hot gas sources. The heating apparatus of the invention may be equipped with one or more flash furnaces (calcining furnaces).

Typically said hot gas coming from hot gas source is exhaust gas at a higher temperature coming from rotary kiln, hot gas after completion of heat exchanging in cooler, hot exhaust gas or gas mixture coming from flash furnace or the like. It is to be noted that said flash furnace represents a furnace which is constructed such that calcining takes place, using as combustion air hot gas after completion of heat exchanging in the cooler, gas mixture of said hot gas and hot exhaust gas from rotary kiln or outside air or the like, while using as fuel heavy oil, coal or other combustible industrial waste. Heat exchanging may be carried out with the aid of fluidized bed.

Next, a method for heating powder material with the use of the heating apparatus as described above will be described in the following. In view of simplified description the invention will be described particularly in case of two hot gas streams employed therefor.

First, hot gas coming from two separate hot gas sources is arranged to flow through two separate hot gas passages, a part of raw material to be processed is charged into a duct by means of a raw material feeder, which leads to a dust collector located in the uppermost portion of one of said hot gas passages (hereinafter referred to as Line A). The charged material is collected in the dust collector and then transferred through a raw material duct located below said dust collector to a duct which leads to the uppermost dust collector in another one of said hot gas passages (hereinafter referred to as Line B). In the vicinity of material transference point as described above the residual part of raw material to be processed is charged by means of another raw material feeder into the duct leading to the uppermost dust collector in Line B. This charged raw material is united with the aforesaid raw material transferred from the dust collector in Line A and then the united raw material is charged into the uppermost dust collector in Line B. Next, the united raw material is charged into the second stage dust collector in Line A through the raw material duct below the dust collector in Line B and then by way of the duct in Line A. Then the raw material is displaced downwards in the predetermined order by way of raw material ducts, hot gas ducts and dust collectors. Then the raw material is charged into the last stage dust collector located in the previous stage before the rotary kiln, as required after it is calcined in the flash furnace, and then the collected raw material is charged through the raw material duct below said dust collector into the conventional sintering furnace such as rotary kiln or the like. The raw material is subjected to the predetermined sintering processing in said sintering furnace and then the sintered material is cooled in the cooler so that the required clinker is produced.

If there are provided three or more hot gas passages, some part of raw material to be processed is charged into the duct leading to the uppermost dust collector in another hot gas passage (Lines C, D - - - ) and then transferred and displaced through other ducts and dust collectors in the same manner as described above.

Now the advantageous features of the method and apparatus in accordance with the present invention will be presented as follows:

(a) availability of hot gas coming from a plurality of hot gas sources located separately from each other, (b) separate flow of the respective hot gas streams through the respective hot gas passages, (c) divided supply of raw material to be processed into a duct which leads to the corresponding dust collector located in the uppermost part of the respective hot gas passages, (d) uniting of divided supplies of raw material, displacing and transference of the united raw material through hot gas ducts, dust collectors and raw material ducts located below the respective dust collectors in the respective hot gas passages in the predetermined order, and increased number of times of heat exchanging between raw material and hot gas, (e) exhausting the waste hot gas streams with the aid of a blower individually mounted therefor.

Owing to the arrangement that raw material to be processed is adapted to travel alternatively through and between the respective hot gas passages, as mentioned above, heat exchanging takes place between raw material and hot gas stream in increased number of times, resulting in a remarkably improved thermal efficiency almost two times as high as that of the conventional method. For instance, in case of four stage type heating apparatus having two hot gas sources connected thereto, heat exchanging takes place in eight times in Line A, while heat exchanging does in seven times in Line B, each of said number of times being almost twice as much as those of the prior art. Consequently raw material is heated at an excellent efficiency with substantially reduced thermal and electrical energy. Further it is pointed out as another advantageous feature with the present invention that since raw material to be processed is charged into the respective hot gas streams in a divided supply manner, temperature and pressure of the respective waste hot gas streams can be individually controlled by separately adjusting supply ratio of raw material for the respective hot gas passages, which causes any controlling device such as dumper or the like not to be required for the respective blower and moreover these blower to be designed and constructed in minimized size and dimension. Controlling the ratio of powder raw material which is charged through each duct which leads to the dust collector located in the uppermost part of the respective hot gas passages, respective hot gas temperature at each blower by means of which the waste hot gas is to be exhausted can be individually controlled.

Figure 1:
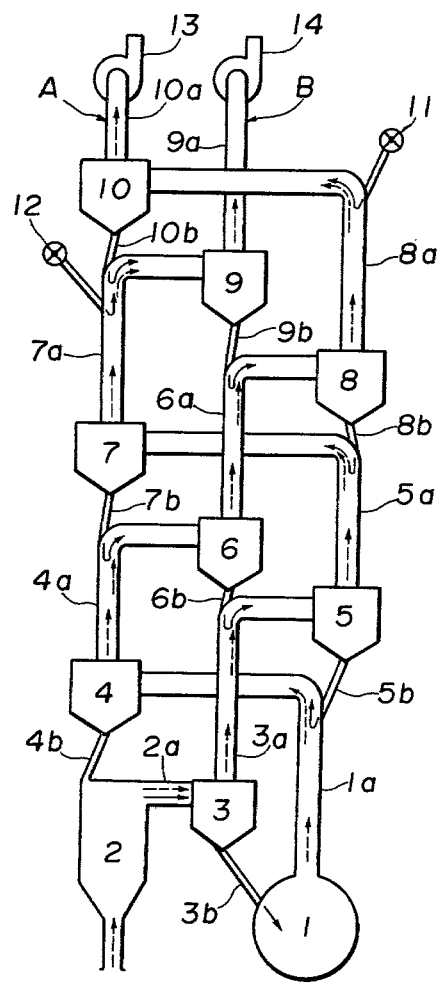
FIG. 1 is a schematic illustration of an apparatus for heating powder material in accordance with the first embodiment of the present invention.
Figure 2:
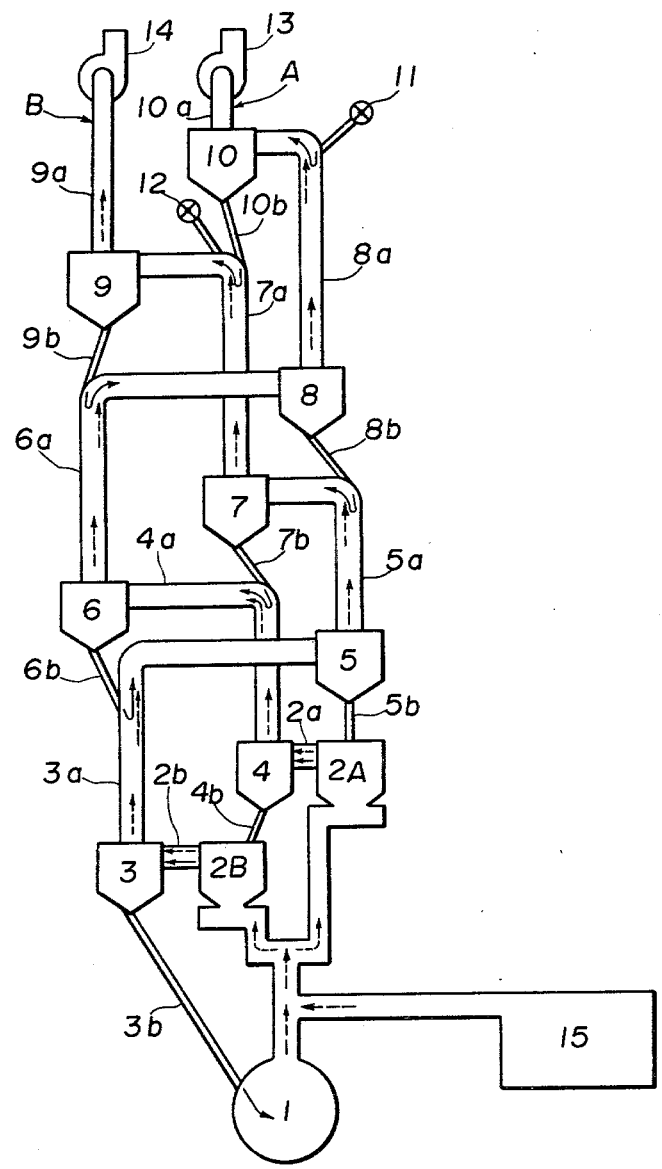
FIG. 2 is a schematic illustration of an apparatus for heating powder material in accordance with the second embodiment of the invention.
Figure 3:
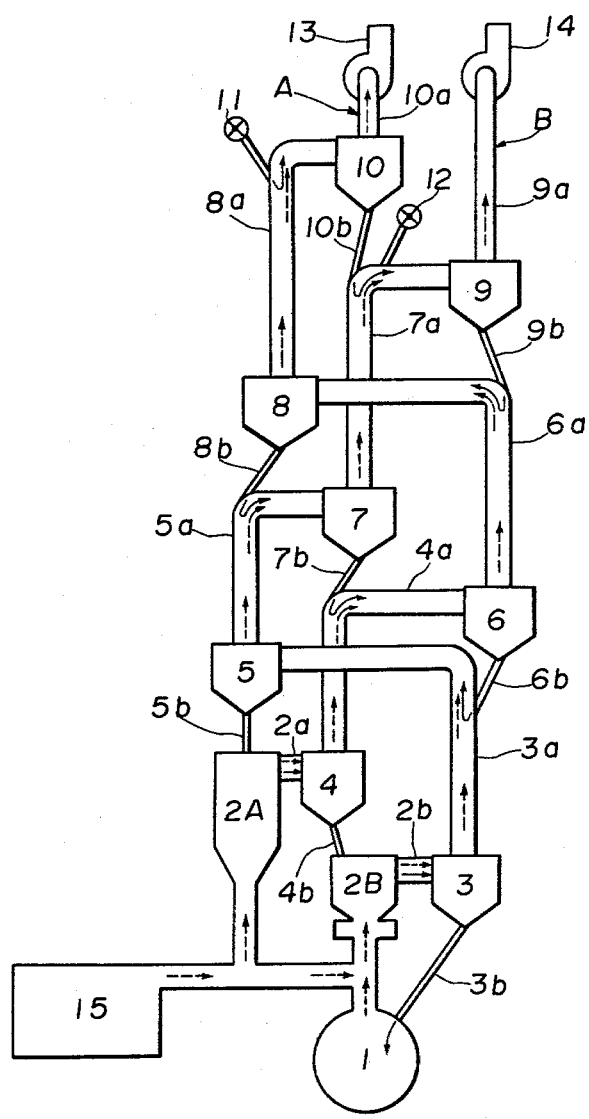
FIG. 3 is a schematic illustration of an apparatus for heating powder material in accordance with the third embodiment of the invention.

Now the present invention will be described in detail with reference to FIGS. 1 to 3, in which the solid lines denote flow of raw material to be processed and the dotted lines denote flow of hot gas, while the reference character A denotes gas passage in Line A and the reference character B denotes gas passage in Line B.

The first embodiment of a heating apparatus in accordance with the present invention will be described with reference to FIG. 1. The first embodiment represents a four stage cyclone type heating apparatus for heating cement raw material, which is connected to two hot gas supply sources, one of which serves to supply exhaust gas from a rotary kiln 1, while the other does hot gas from a flash furnace 2 where hot air after completion of heat exchange in a cooler is used for combustion air.

A portion of raw material to be processed is charged from a raw material feeder 11 in Line A into a duct 8a which leads to a dust collector 10 located in the uppermost part of hot gas flow which comprises exhaust gas from the rotary kiln 1 in Line A, whereby the heated raw material is conveyed to said dust collector 10 together with hot gas. The raw material collected in the dust collector 10 is transferred through a raw material duct 10b arranged below the dust collector 10 into a duct 7a which leads to a dust collector 9 located in the uppermost part of another hot gas flow which comprises hot gas from the flash furnace 2 in Line B. In the vicinity of the material transference point as described above the residual part of raw material is charged through a raw material feeder 12 in Line B. The aforesaid two portions of raw material are united and then the united raw material is conveyed to said dust collector 9. The raw material collected in the dust collector 9 is delivered through a raw material duct 9b arranged below the dust collector 9 to a duct 6a which leads to a dust collector 8 located by one stage below the uppermost part of the hot gas flow from the rotary kiln 1 in Line A. The collected material in the dust collector 8 is delivered through a raw material duct 8b to a duct 5a in Line B. Further the raw material is transferred through dust collector 7, raw material duct 7b, duct 4a, dust collector 6, raw material duct 6b, duct 3a, dust collector 5, raw material duct 5b and duct 1a to dust collector 4 in accordance with such an order as mentioned above. The raw material collected in the last mentioned dust collector 4 is delivered through a raw material duct 4b into the flash furnace 2 so as to be substantially completely calcined therein. The calcined raw material is displaced through a duct 2a, collected in an adjacent dust collector 3 and then delivered through a raw material duct 3b into the rotary kiln 1. After the raw material is sintered in the rotary kiln 1, it is subjected to cooling in a cooler (not shown) so that cement clinker is obtained. In the meantime, hot gas from the rotary kiln 1 in Line A is exhausted into the air through a duct 10a with the aid of a blower 13 mounted above said duct 10a after completion of heat exchange with raw material to be processed, while another hot gas from the flash furnace 2 in Line B is exhausted through a duct 9a with the aid of a blower 14 mounted above said duct 9a.

For instance, when charging 18% of raw material to be processed by way of the raw material feeder 11 for Line A and 82% by way of the raw material feeder 12 for Line B as one of typical operations of the above-described heating apparatus, it is recognized that hot gas at the blower 13 in Line A has a temperature of 290° C. (at static pressure of 732 mm Aq), while hot gas at the blower 14 in Line B has a temperature of 320° C. (at static pressure of 760 mm Aq). This makes it clear that separate supply of raw material by means of each feeder enables the respective hot gas temperature to be individually controlled.

Moreover it is found out that the heating apparatus in accordance with the first embodiment of the invention has an advantage that total thermal and electrical energy required for preheating, calcining and sintering cement is reduced by approx. 5.5 liters of C-grade heavy oil in thermal energy and approx. 2.5 KWH in electrical energy particularly due to reduced shaft force for the blower per one ton cement clinker respectively in comparison with the conventional apparatus which comprises a preheating device, a flash furnace and a rotary kiln (the former being equivalent to approx. 7% reduction, while the latter being equivalent to 24% reduction in comparison with the prior art method). It is apparent from the foregoing that the method and apparatus in accordance with the invention bring about remarkable reduction in thermal energy required for preheating and calcination of powder material such as cement raw material or the like.

Next, the present invention will be described further with reference to FIG. 2 which illustrates the arrangement in accordance with the second embodiment of the invention. It is to be noted that the same parts or members as those in FIG. 1 are given the same reference number. The heating apparatus in accordance with the second embodiment of the present invention represents a four stage cyclone type heating apparatus for heating cement raw material, which is connected to two hot gas supply sources, wherein hot gas to be used for the heating apparatus is hot gas coming from two flash furnaces 2A and 2B where a gas mixture of exhaust gas from the rotary kiln 1 and hot gas coming from the cooler 15 after completion of heat exchanging therein is employed as combustion air.

A portion of raw material to be processed is charged from the raw material feeder 11 in Line A into the duct 8a which leads to the dust collector 10 located in the uppermost part of hot gas flow which comprises hot gas from the flash furnace 2A in Line A and then the heated raw material is conveyed to said dust collector 10 together with the hot gas. The raw material collected in the dust collector 10 is transferred through the raw material duct 10b arranged below the dust collector 10 into a duct 7a which leads to another dust collector 9 located in the uppermost stage of another hot gas flow which comprises hot gas from the flash furnace 2B in Line B. In the vicinity of the material transference point as described above the residual portion of raw material is charged from the raw material feeder 12 in Line B. The aforesaid two portions of raw material are united there and then the united raw material is conveyed to said dust collector 9. The raw material collected in the dust collector 9 is delivered through the raw material duct 9b arranged below the dust collector 9 to the duct 6a which leads to the dust collector 8 located by one stage below the uppermost part of the hot gas flow from the flash furnace 2A in Line A. Then the collected material in the dust collector 8 is delivered through the raw material duct 8b to the duct 5a in Line B. Further the raw material is transferred through the dust collector 7, raw material duct 7b, duct 4a, dust collector 6, raw material duct 6b and duct 3a to the dust collector 5 in accordance with such an order as mentioned above. The raw material collected in the last mentioned dust collector 5 is delivered through the raw material duct 5b into the flash furnace 2A in Line A, then the preheated and calcined raw material is transferred through the duct 2a into the dust collector 4 and then further transferred through the raw material duct 4b into the flash furnace 2B in Line B. After the raw material is substantially completely calcined in said flash furnace 2B, the calcined material is conveyed through the duct 2b into the dust collector 3 and then the collected material is delivered through the raw material duct 3b into the rotary kiln 1 so as to be sintered therein. In the meantime, hot gas from the flash furnace 2A in Line A is exhausted into the air through the duct 10a with the aid of the blower 13 mounted above said duct 10a, while another hot gas from the flash furnace 2B in Line B is exhausted through the duct 9a with the aid of the blower 14 mounted above said duct 9a.

Next, the present invention will be described further with reference to FIG. 3 which illustrates the arrangement in accordance with the third embodiment of the invention. It is to be noted that the same parts or members as those in FIGS. 1 and 2 are given the same reference numeral.

The third embodiment of the present invention is concerned with a four stage cyclone type heating apparatus for heating cement raw material, which is connected to two hot gas supply sources, wherein hot gas to be used for the heating purpose comprises hot gas coming from the flash furnace 2A in which only hot gas after heat exchanging in the cooler 15 is used as combustion air, while combustible industrial waste is used as fuel source, and hot gas coming from flash furnace 2B in which a gas mixture of hot gas after heat exchanging in said cooler 15 and exhaust gas from the rotary kiln 1 is used as combustion air, while heavy oil or coal is used as fuel.

A portion of raw material to be processed is charged from the raw material feeder 11 in Line A into a duct 8a which leads to the dust collector 10 located in the uppermost part of hot gas flow which comprises hot gas from the flash furnace 2A in Line A and then the heated material is conveyed to said dust collector 10 together with the hot gas. The raw material collected in the dust collector 10 is transferred through the raw material duct 10b arranged below the dust collector 10 into the duct 7a which leads to the dust collector 9 located in the uppermost stage of another hot gas flow which comprises hot gas from the flash furnace 2B in Line B. In the vicinity of the material transference point as described above the residual portion of raw material is charged through the raw material feeder 12 in Line B. The aforesaid two portions of raw material are united therein and then the united raw material is conveyed to said dust collector 9 together with the hot gas. The raw material collected in the dust collector 9 is delivered through the raw material duct 9b arranged below the dust collector 9 to the duct 6a which leads to the dust collector 8 located by one stage below the uppermost part of the hot gas flow from the flash furnace 2A in Line A. The collected material in the dust collector 8 is delivered through the raw material duct 8b to the duct 5a in Line B. Further the raw material is transferred through the dust collector 7, raw material duct 7b, duct 4a, dust collector 6, raw material duct 6b and duct 3a to the dust collector 5 in accordance with such an order as mentioned above. The raw material collected in the last mentioned dust collector 5 is delivered through the raw material duct 5b into the flash furnace 2A in Line A. Then the preheated and calcined raw material is transferred through the raw material duct 2a into the dust collector 4 and further transferred through the raw material duct 4b into the flash furnace 2B in Line B. After the material is substantially completely calcined in said flash furnace 2B, the calcined material is displaced through the raw material duct 2b to the dust collector 3 and then the collected material is delivered through the raw material duct 3b into the rotary kiln 1 so as to be sintered therein. In the meantime, hot gas from the flash furnace 2A in Line A is exhausted into the air through the duct 10a with the aid of the blower 13 mounted above said duct 10a, while another hot gas from the flash furnace 2B in Line B is exhausted through the duct 9a with the aid of the blower 14 mounted above said duct 9a.

Hence the heating apparatus in accordance with the second and third embodiments as described above brings about the substantially same advantages as in case of the first embodiment of the invention.

Moreover to illustrate the inventive effects of the apparatus and method of the present invention, the arrangement in accordance with the invention will be described particularly in respect of technical difference from those of the prior art with reference to FIG. 4(A) to (C).

FIG. 4(A) is a schematic illustration of the heating apparatus in accordance with the invention (hereinafter referred to as subject invention A).

FIG. 4(B) is a schematic illustration of the heating apparatus of the prior art, which is constructed such that powder raw material is charged into the rotary kiln after completion of heat exchanging between the exhaust gas coming from a single heat source, that is, the outlet of the rotary kiln and the raw material which is displaced from the uppermost stage cyclone to the lowermost stage one of the suspension type preheater in a cascade manner, wherein the exhaust gas is exhausted with the aid of a single blower (hereinafter referred to as prior art B).

FIG. 4(C) is another illustration of the heating apparatus of the prior art, which is constructed such that raw material supplied through a single raw material feeder which is located at the uppermost stage cyclone of the suspension preheater is charged into the rotary kiln after completion of heat exchanging between the raw material and hot gas, said heat exchanging being effected in such a manner that hot gas from a single heat source is divided into two branch flows and the raw material is displaced downwards, alternately wandering from one to the other branch flow, wherein the waste branch gas flows are united and then exhausted into the air with the aid of a single blower (hereinafter referred to as prior art C, which is typically disclosed in Japanese Patent Publication No. 22855/64).

In FIG. 4(A) to (C) the reference characters R, $R_A$ and $R_B$ denote raw material, G, $G_A$ and $G_B$ denote exhaust gas, $T_0$ and $T_{B0}$ denote hot gas source such as rotary kiln. $T_{A0}$ denotes another hot gas source which is flash furnace and $T_1$, $T_2$, $T_{A1}$ and $T_{B1}$ et al. denote dust collector such as cyclone or the like.

The results as illustrated in FIG. 5 are obtained, when powder material is heated with the use of the heating apparatus as illustrated in FIG. 4(A) to (C). The abscissa in FIG. 5 represents number of stage of cyclone, while the ordinate represents thermal efficiency. Further the curves A, B and C in FIG. 5 are a plotted line with the heating apparatus of the subject invention A, that of the prior art B and that of the prior art C respectively.

As apparent from FIG. 5, the subject invention A is remarkably superior to the prior arts B and C particularly in respect of thermal efficiency at any number of cyclone stage. Specifically owing to the arrangement of the subject invention A comprising the structural requirements ($A_1$) to ($A_5$) of ($A_1$) a plurality of separate heat sources, ($A_2$) two inlets for supply of raw material, ($A_3$) a plurality of gas passages, ($A_4$) wandering of the united powder material from one hot gas passage to the other gas passage and ($A_5$) a plurality of blowers, this new method has a high thermal efficiency remarkably improved in comparison with the prior art C (FIG. 4(C)) comprising the structural requirements ($C_1$) to ($C_5$) of ($C_1$) single heat source, ($C_2$) one inlet for supply of raw material, ($C_3$) two gas passages, ($C_4$) travelling of raw material through said two gas passages and ($C_5$) single blower means. Moreover the method of the subject invention A has a more improved thermal efficiency also in comparison with the another prior art B (FIG. 4(B)) comprising the structural requirements ($B_1$) to ($B_5$) comprising ($B_1$) single heat source, ($B_2$) one inlet for supply of raw material, ($B_3$) single gas passage, ($B_4$) displacing of raw material in a cascade manner and ($B_5$) single blower means.

As described above, the method and apparatus of the subject invention A for heating powder material are quite different from those of the prior arts B and C particularly with a substantially difference therefrom in thermal efficiency.

Finally it should be noted that the present invention has been described above with reference to the preferred embodiments thereof but the same may be adequately modified or changed without any departure from the spirit and scope of the invention as set forth in the claim.

What is claimed is:

1. An apparatus for heating powder material, comprising:
a plurality of vertically disposed hot gas ducts for flowing hot gas streams upwardly therethrough, said hot gas ducts being separate from one another;
separate hot gas sources respectively connected to lower ends of the respective hot gas ducts for supplying hot gas to said hot gas ducts;
separate blowers connected to respective uppermost portions of said respective gas ducts for exhausting hot gas from said respective hot gas sources;
dust collectors respectively positioned along and in fluid communication with each of the respective hot gas ducts;
said duct collectors positioned, respectively between said respective hot gas sources and said respective blowers, each of said hot gas ducts having an uppermost dust collector in fluid communication with its respective blower by means of the respective uppermost portion of said hot gas duct connected thereto and a second dust collector in fluid communication with and positioned upstream from said respective uppermost dust collector by means of a second portion of said respective hot gas duct, whereby hot gas can flow from each of the respective hot gas sources to the respective second dust collectors, second portions of said hot gas ducts, uppermost dust collectors, and blowers, respectively;
a plurality of separate raw material feeders, each respectively connected to the respective second portions of said hot gas ducts;
raw material ducts connecting the bottoms of said respective dust collectors of one of the hot gas ducts to respective portions of another one of said hot gas ducts positioned below said respective dust collectors of said one hot gas duct; and
a lowermost dust collector positioned along and in fluid communication with one of the respective hot gas ducts, said lowermost dust collector having a raw material duct for discharging raw material downwardly therefrom.

2. An apparatus as set forth in claim 1, wherein the number of each of the hot gas passages, hot gas sources, blowers and raw material feeders is two.

3. An apparatus as set forth in claim 2 wherein each of the respective dust collectors positioned along each of the hot gas ducts has a raw material duct extending between the bottom of each dust collector to respective portions of the hot gas duct along which it is not positioned.

4. An apparatus as set forth in claim 2 further including a cooler, and wherein one of the hot gas sources is a rotary kiln and the other is a flash furnace, said flash furnace being connected to said cooler by a duct, said rotary kiln being connected to the lowermost dust collector through its raw material duct.

5. An apparatus as set forth in claim 2 further including a cooler, and a rotary kiln and wherein each of the hot gas sources is a flash furnace; said flash furnaces each being connected to said cooler and exhaust gas from the rotary kiln can flow into the flash furnaces, said rotary kiln being connected to the lowermost duct collector through its raw material duct.

6. An apparatus as set forth in claim 1 wherein the uppermost dust collector positioned along one of said hot gas dusts is connected to the second portion of another of said hot gas ducts by its raw material duct.

7. A method for heating powder material, comprising: providing an apparatus including a plurality of vertically disposed hot gas ducts for flowing hot gas streams upwardly therethrough, said hot gas ducts being separate from one another; separate hot gas sources respectively connected to lower ends of the respective hot gas ducts for supplying hot gas to said hot gas ducts; separate blowers connected to respective uppermost portions of said respective gas ducts for exhausting hot gas from said respective hot gas sources; dust collectors respectively positioned along and in fluid communication with each of the respective hot gas ducts; said dust collectors positioned, respectively between said respective hot gas sources and said respective blowers, each of said hot gas ducts having an uppermost dust collector in fluid communication with its respective blower by means of the respective uppermost portion of said hot gas duct connected thereto and a second duct collector in fluid communication with and positioned upstream from said respective uppermost dust collector by means of a second portion of said respective hot gas duct, whereby hot gas can flow from each of the respective hot gas sources to the respective second dust collectors, second portions of said hot gas ducts, uppermost dust collectors, and blowers, respectively; a plurality of separate raw material feeders, each respectively connected to the respective second portions of said hot gas ducts; raw material ducts connecting the bottoms of said respective dust collectors of one of the hot gas ducts to respective portions of another one of said hot gas ducts positioned below said respective dust collectors of said one hot gas duct; and a lowermost dust collector positioned along and in fluid communication with one of the respective hot gas ducts, said lowermost dust collector having a raw material duct for discharging raw material downwardly therefrom;

causing hot gas from the hot gas sources to flow separately through the hot gas ducts;

separately charging raw powder material to the hot gas ducts by the raw material feeders;

joining the powder material from each of the raw material feeders together by means of the raw material duct connected to an uppermost dust collector;

alternately flowing the joined powder material from one hot gas duct to another hot gas duct one after another through the respective raw material ducts, thereby heating the joined powder material by heat exchanging with the hot gas in said hot gas ducts; and discharging the heated powder material from the raw material duct connected to the lowermost dust collector.

8. A method as set forth in claim 7 including the step of separately charging said raw powder material to the hot gas ducts in a predetermined ratio to control the hot gas temperature at each blower.

* * * * *